United States Patent
Bocanegra Alvarez et al.

(10) Patent No.: US 9,736,143 B2
(45) Date of Patent: Aug. 15, 2017

(54) CUSTOMIZED LOG-IN EXPERIENCE

(71) Applicant: Adobe Systems Incorporated, San Jose, CA (US)

(72) Inventors: Tobias M. Bocanegra Alvarez, San Francisco, CA (US); David B. Nuescheler, Salt Lake City, UT (US)

(73) Assignee: Adobe Systems Incorporated, San Jose, CA (US)

( * ) Notice: Subject to any disclaimer, the term of this patent is extended or adjusted under 35 U.S.C. 154(b) by 137 days.

(21) Appl. No.: 14/058,527

(22) Filed: Oct. 21, 2013

(65) Prior Publication Data

US 2015/0113626 A1 Apr. 23, 2015

(51) Int. Cl.
- G06F 7/04 (2006.01)
- G06F 15/16 (2006.01)
- G06F 17/30 (2006.01)
- H04L 29/06 (2006.01)
- H04L 29/08 (2006.01)

(52) U.S. Cl.
CPC .......... *H04L 63/0815* (2013.01); *H04L 67/02* (2013.01)

(58) Field of Classification Search
CPC .......... G06F 17/3089; G06F 17/30893; G06F 17/243; G06F 21/41; H04L 67/2838
USPC ...................................... 726/8; 715/744–747
See application file for complete search history.

(56) References Cited

U.S. PATENT DOCUMENTS

| | | | |
|---|---|---|---|
| 7,293,034 B2 * | 11/2007 | Paya et al. | |
| 7,424,459 B2 * | 9/2008 | Bodmer et al. | 705/64 |
| 7,516,418 B2 * | 4/2009 | Herley et al. | 715/816 |
| 7,827,478 B2 * | 11/2010 | Farr et al. | 715/222 |
| 9,274,669 B1 * | 3/2016 | Funderburk | G06F 3/0481 |
| 2003/0046401 A1 * | 3/2003 | Abbott et al. | 709/228 |
| 2005/0055438 A1 * | 3/2005 | Matti | G06F 17/243 709/224 |
| 2008/0034420 A1 * | 2/2008 | Chang | 726/15 |
| 2009/0198987 A1 * | 8/2009 | Sumioka et al. | 709/202 |
| 2009/0319355 A1 * | 12/2009 | Sinyagin | G06Q 30/0224 705/14.25 |
| 2011/0214067 A1 * | 9/2011 | Tanaka | 715/745 |
| 2013/0198595 A1 * | 8/2013 | Waldman | G06F 17/243 715/205 |
| 2014/0173405 A1 * | 6/2014 | Ferrara et al. | 715/223 |

(Continued)

*Primary Examiner* — Dede Zecher
*Assistant Examiner* — Vadim Savenkov
(74) *Attorney, Agent, or Firm* — Wolfe-SBMC

(57) ABSTRACT

Techniques for a customized log-in experience are described in which, script associated with a log-in page is configured to recognize a domain identifier associated with a user log-in attempt via the page. The domain identifier may correspond to a particular customer or company that makes use of web applications and/or other resources from a service provider. The domain identifier may be employed to download or otherwise access data sufficient to implement one or more customizations of the log-in page that correspond to the domain identifier, such as a company logo, a custom background, custom styles, and so forth. The one or more customizations that correlate to the domain identifier are applied to customize the log-in page in a pre-login environment prior to completion of the user log-in attempt. In this way, a tailored user experience is provided even before user authentication to access resources from the service provider.

20 Claims, 6 Drawing Sheets

(56) References Cited

U.S. PATENT DOCUMENTS

2014/0181788 A1* 6/2014 Sullivan ................ G06F 9/4443
717/109

* cited by examiner

CUSTOMIZED LOG-IN EXPERIENCE

BACKGROUND

Individuals have increasing access to and make frequent use of resources including web applications available from service providers. Generally, web applications are applications that are accessed over a network using a browser or other network-enabled client application to obtain and run client-side code for the web application. Web applications may make use of runtime support (e.g., a runtime environment) for common protocols, programming languages, and components integrated with the browser or network-enabled client application in lieu of deploying device-specific client code. This approach may simplify portability of the web applications for use with different computing platforms and architectures and enables service providers to customers.

During log-in, browsers and other network enabled client applications traditionally present a default log-in page of a service provider since the particular user attempting to log-in is not known ahead of time. As such, user-specific customizations of a user interface for web applications traditionally cannot be made until after authentication of a user, which detracts from the overall user experience.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Techniques for a customized log-in experience are described herein. In one or more implementations, script included with or otherwise associated with a log-in page is configured to recognize information regarding a domain identifier associated with a user log-in attempt via the page. The domain identifier may correspond to a particular customer or company that makes use of web applications and/or other resources from a service provider. The domain identifier may be employed to download or otherwise access data sufficient to implement one or more customizations of the log-in page that correspond to the domain identifier, such as a company logo, a custom background, custom styles, and so forth. The one or more customizations that correlate to the domain identifier are applied to customize the log-in page in a pre-login environment prior to completion of the user log-in attempt. In this way, a tailored user experience is provided even before user authentication to access resources from the service provider.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Techniques for a customized log-in experience are described herein. In one or more implementations, script included with or otherwise associated with a log-in page is configured to recognize information regarding a domain identifier associated with a user log-in attempt via the page. In one approach, the domain identifier is determined by parsing a username in the form of an email to ascertain a company name or other suitable identifier. The domain identifier may correspond to a particular customer or company that makes use of web applications and/or other resources from a service provider. For instance, if a user inputs a username "tobias@companyx.com" for a username field in the log-in page, the username may be parsed to recognize "companyx" as a domain identifier for the log-in attempt. In another approach, a domain identifier may be in the form of a host name or subdomain name included in a URL used to access the log-in page.

The domain identifier may be employed to download or otherwise access data sufficient to implement one or more customizations of the log-in page that correspond to the domain identifier, such as a company logo, a custom background, custom styles, and so forth. For example, the domain identifier may be used to construct a navigation path name or address in a specified format to access a domain specific style document that defines the customizations from a server database, a local cache, or other designated storage location. In the above example, the domain identifier "companyx" may be used to create a path to locate a particular location, folder, document and/or file that contains information indicative of one or more corresponding customizations. The one or more customizations that correlate to the domain identifier may be obtained using the constructed navigation path name and subsequently applied to customize the log-in page in a pre-login environment prior to completion of the user log-in attempt. In this way, a tailored user experience is provided even before user authentication to access resources from the service provider.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

Figure 1:
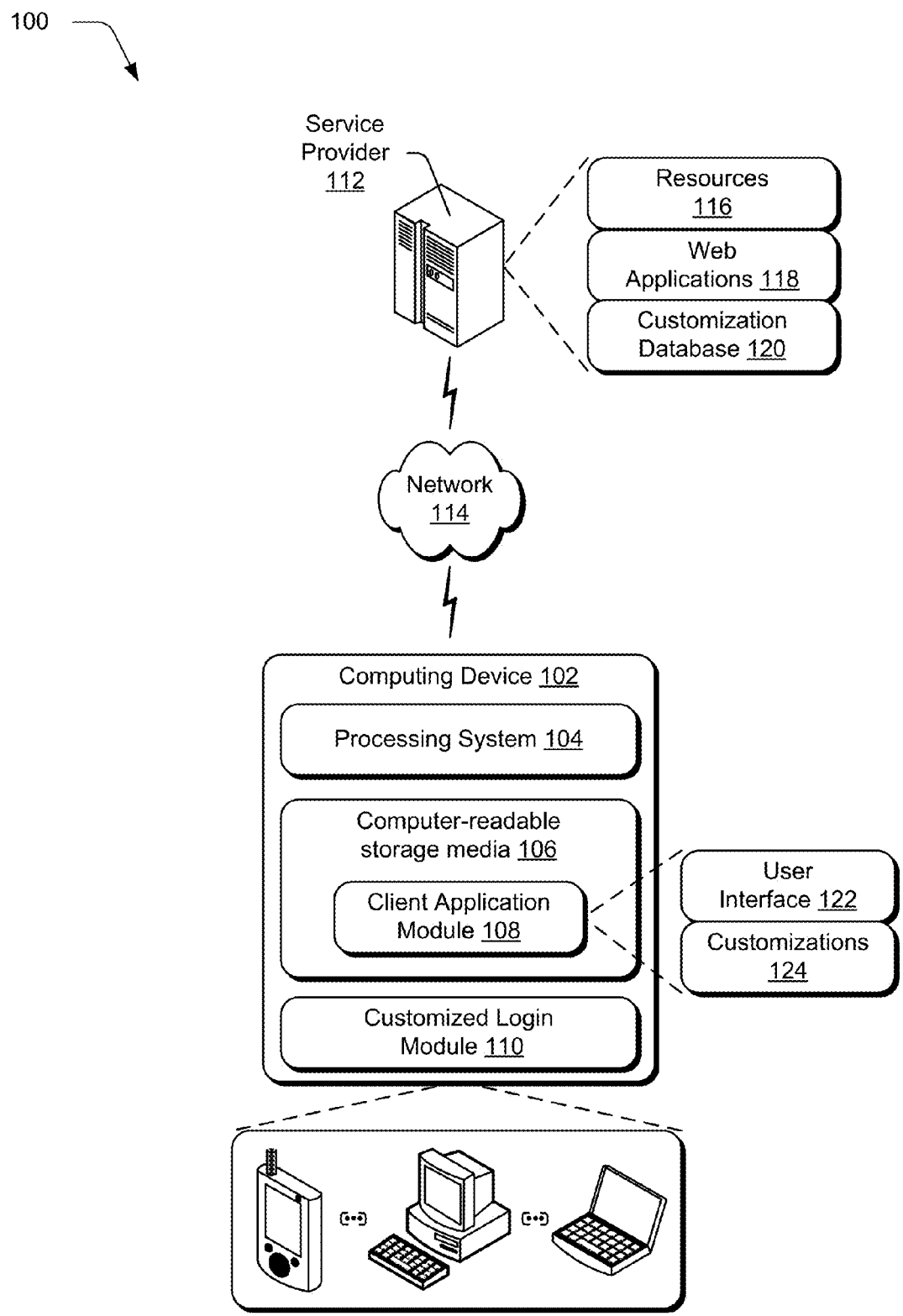
FIG. 1 is an illustration of an environment in an example implementation that is operable to employ techniques described herein.

FIG. 1 is an illustration of an environment 100 in an example implementation that is operable to employ techniques described herein. The illustrated environment 100 includes a computing device 102 including a processing system 104 that may include one or more processing devices, one or more computer-readable storage media 106 and a client application module 108 embodied on the computer-readable storage media 106 and operable via the processing system 104 to implement corresponding functionality described herein. In at least some embodiments, the client application module 108 may represent a browser of the computing device operable to access various kinds of web-based resources (e.g., content and services). The client application module 108 may also represent a client-side component having integrated functionality operable to access web-based resources (e.g., a network-enabled application), browse the Internet, interact with online providers, and so forth.

The computing device 102 may also include or make use of a customized log-in module 110 that represents functionality operable to implement techniques for a customized log-in experience described above and below. For instance, the customized log-in module 110 may be operable to recognize domain identifiers during log-in attempts, obtain domain-specific customizations for a log-in page that correlate to the domain identifiers, and apply the customization to the log-in page to tailor the user experience in a pre-login environment. Details regarding these and other aspects of customizing a log-in experience are discussed throughout this document.

The customized log-in module 110 may be implemented as a software module, a hardware device, or using a combination of software, hardware, firmware, fixed logic circuitry, etc. The customized log-in 110 may be implemented as a standalone component of the computing device 102 as illustrated. In addition or alternatively, the customized log-in module 110 may be configured as a component of the client application module 108, an operating system, or other device application. For example, the customized log-in module 110 may be provided as a plug-in and/or downloadable script for a browser. The customized log-in module 110 may also represent script contained in or otherwise accessible via a webpage, web application, or other resources made available by a service provider.

The computing device 102 may be configured as any suitable type of computing device. For example, the computing device may be configured as a desktop computer, a laptop computer, a mobile device (e.g., assuming a handheld configuration such as a tablet or mobile phone), a tablet, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 6.

The environment 100 further depicts one or more service providers 112, configured to communicate with computing device 102 over a network 114, such as the Internet, to provide a "cloud-based" computing environment. Generally, speaking a service provider 112 is configured to make various resources 116 available over the network 114 to clients. In some scenarios, users may sign-up for accounts that are employed to access corresponding resources from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and/or content typically made available over a network by one or more providers. Some examples of services include, but are not limited to, a photo editing service, a web development and management service, a collaboration service, a social networking service, a messaging service, an advertisement service, and so forth. Content may include various combinations of text, video, ads, audio, multi-media streams, animations, images, web documents, web pages, applications, device applications, and the like.

Web applications 118 represent one particular kind of resource 116 that may be accessible via a service provider 112. As mentioned, web applications 118 may be operated over a network 114 using a browser or other client application module 108 to obtain and run client-side code for the web application. In at least some implementations, a runtime environment for execution of the web application 118 is provided by the browser (or other client application module 108). The runtime environment supports web applications 118 that may be written using dynamic scripting languages, such as JavaScript, hypertext markup language revision 5 and cascading style sheets (HTML5/CSS), and/or extensible application mark-up language (XAML). Script-based web applications may operate through corresponding runtime environments supported by a device that are configured to provide respective execution environments for corresponding applications. The runtime environments may provide a common set of features, routines, and functions for compatible applications thereby offloading coding of common tasks from application development. Thus, the runtime environment can facilitate portability of web applications to different kinds of systems and architectures with little or no change to the script for the applications. Various types of runtime environments may be employed including but not limited to JAVA™ runtime environment (JRE) and Adobe™ Flash™, to name a few examples.

The service provider is further illustrated as including a customization database 120. The customization database 120 is representative of a server-side repository of information regarding domain-specific customizations that may be applied to customize a log-in page. Using a server-side repository for domain-specific customization information enables log-in customizations to be implemented without storing state data indicative of customizations individually at each client device. As mentioned, domain-specific customizations may correlate to a particular domain, and a particular company/customer. Domain-specific customizations may also be defined for particular groups of users and/or individual users/customers.

The customization database 120 may be implemented in various ways to make information regarding domain-specific customizations accessible to client applications. Generally speaking, the customization database 120 is configured to map different domain identifiers to corresponding customizations. The customization database 120 may be configured as as a relational database, object oriented database, a cloud-based database, a distributed database, or other suitable database. The customization database 120 may also represent other forms of data sufficient to describe domain-specific customizations such as a table, a data file, navigable file structure, mark-up language document, or other data structure suitable to facilitate look-up of domain-specific customizations based on different domain identifiers.

In one approach, the customization database 120 stores style documents that are mapped to each domain/customer/user based on corresponding identifiers. In particular, the style documents may be configured as web style sheets that may be applied to a mark-up language document (XML, HTML, etc.) to specify and control the visual layout and appearance of the document content. The web style sheets may be written using a style sheet language, examples of which include but are not limited to cascading style sheets (CSS) and extensible style sheet language transformations (XSLT).

Although depicted as being associated with a service provider 112, a customization database 120 may be deployed to the computing device 102 (e.g., client-side) or to a third-party service in some implementations. In one approach, a cache of domain-specific customizations previously accessed via a computing device 102 may be maintained locally at a computing device 102 for subsequent access. Thus, the customization database 120 may be provided in various forms to enable look-up and download of domain-specific customizations to implement customization is a pre-login environment by a computing device.

In operation, a browser (or other client application module 108) may be employed to access resources 116 over the network 114 from a service provider 112, Accordingly, a user interface 122 that is output by the computing device may be configured to incorporate various different customizations 124 based on domain-specific customizations that are obtained from a server, a local cache, or otherwise. The user interface 122 may represent a log-in page, home page, or other page associated with a web application 118 or service from a service provider 112. Customizations 124 may be applied to the log-in page or other user interface 122 as soon as a suitable domain identifier is recognized. This may occur based on user input of a username or a URL to access a particular hosted site indicative of the domain identifier. In an implementation, the customizations 124 may be retrieved responsive to input of partial credentials, such as input of an email address as a username that includes the domain identifier. In another approach, explicit input of the domain identifier (e.g., company name) in a username field or other designated field (e.g., a dedicated company or domain field) exposed by the log-in page may be used to trigger corresponding customizations of the page. In this manner, customizations 124 may be accessed and applied in a pre-login environment prior to log-in to gain access to resources 116 from a service provider. In other words, customization of the user interface 122 may occur without input of a user's full credentials (e.g., username and password) and before log-in/authentication of a user is completed.

Having considered an example environment, consider now a discussion of some example details of techniques for customized log-in experiences in accordance with one or more implementations.

Customized Log-In Experiences Details

This section describes some example details of customized log-in experiences in accordance with one or more implementations. Web applications and/or other resources may be accessed from one or more servers of a service provider 112 and may be executed on demand via a browser. Generally, a web application is browser and platform agnostic and accordingly may be employed with different types of browsers, systems, platforms, and architectures. Thus, the web application developer is relieved of the burden of producing different implementations of the application for different hardware, device, and software combinations. In addition, a web application may service a plurality of different customers that may be associated with different domains and domain identifiers. A log-in experience associated with a web application and/or other resources available from a service provider may be customized in various ways as discussed herein.

Figure 2:
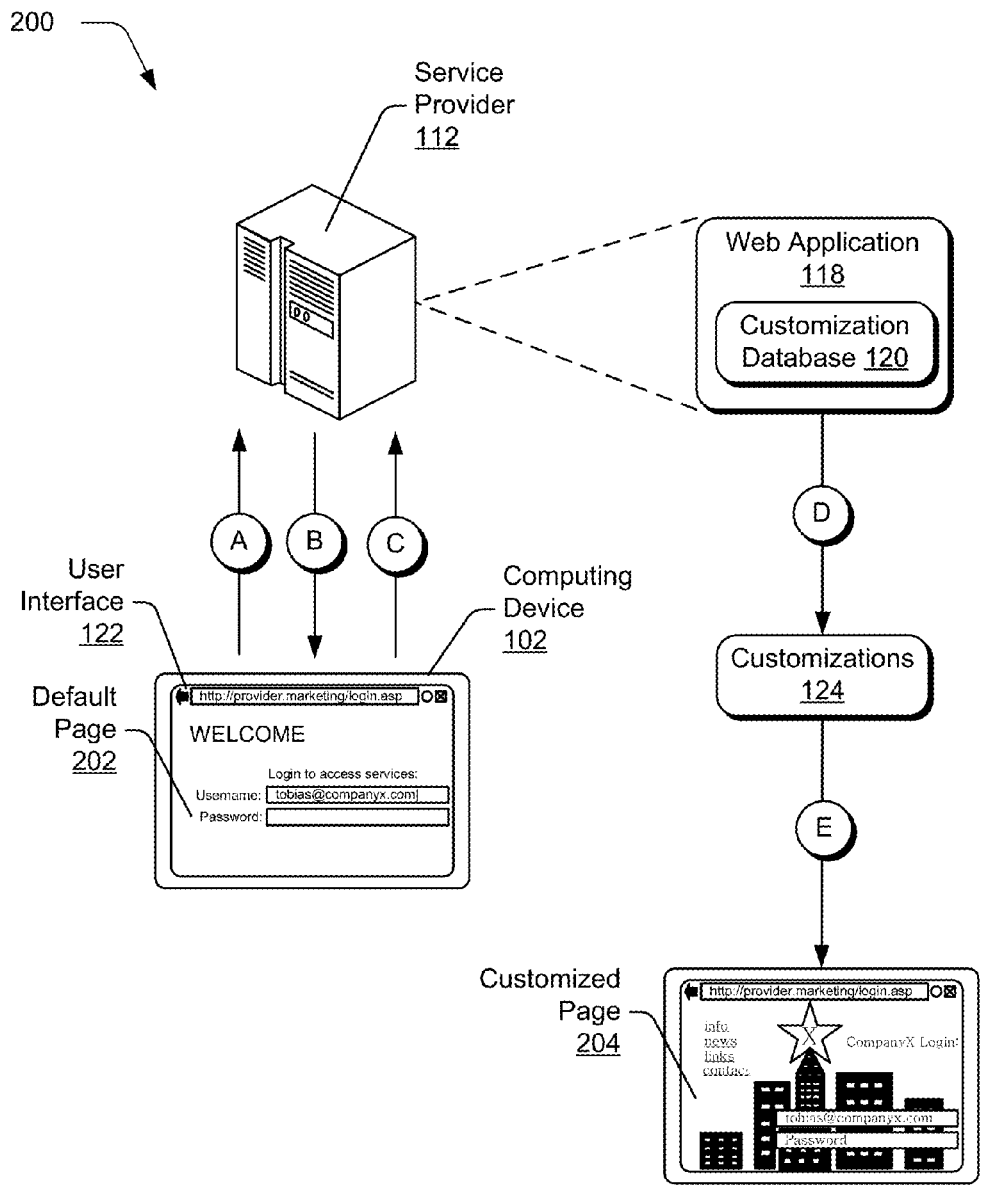
FIG. 2 illustrates a scenario that provides a customize log-in experience in accordance with one or more implementations.

To illustrate, FIG. 2 depicts generally at 200 an example scenario in which a default log-in page may be customized in a domain-specific manner. Here, letters "A" to "E" are used to denote different example operations that may occur as part the scenario. The scenario represents a user interface 122 of a computing device 102 in the form of a default page 202. The default page 202 may correspond to resources 116 from a service provide 112, and in particular a log-in page to implement functionality to gain access to the resources 116 including access to one or more web applications 118. At "A", a user may interact via a computing device 102 with a service provider 112 to make use of a web application 118. In particular, a user may navigate a browser (or other application) to access resources from the service provider 112, such as by choosing a link or typing in a particular URL that corresponds to the web application 118 or another resource. In response, the browser may request the corresponding resource and the log-in page may be communicated from the server at "B" for receipt and output by the browser. The log-in page may be configured as a default page 202, e.g., a page that does not have domain-specific customizations.

Figure 3:
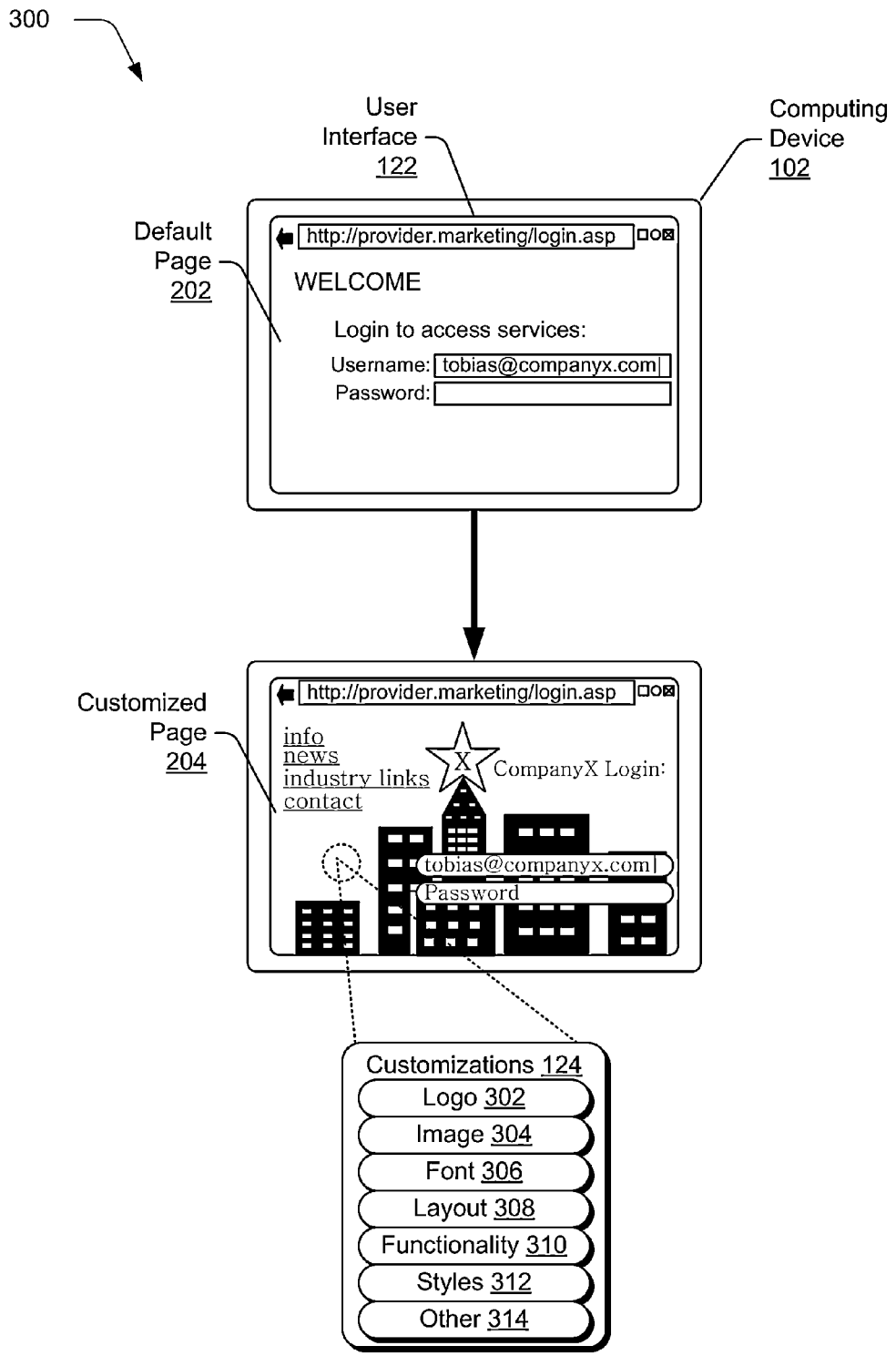
FIG. 3 illustrates example customizations in accordance with one or more implementations.

As represented in FIG. 2, the log-in page may include input fields to facilitate verification of credentials such as username/user ID and password fields. Detailed versions of the example pages in FIG. 2 are shown in FIG. 3. A customized log-in module 110 may be operable to monitor and/or parse one or more fields of the log-in page to extract domain identifiers. The customized log-in module 110 may be configured as an application plug-in and or executable script associated with the browser/application. The customized log-in module 110 may also be a standalone module deployed to the client that applications may be invoked to implement customizations described herein. Further, script to implement the customized log-in module 110 may be incorporated with the default page 202, web application 118, or other resources 116 accessible via the service provider.

In an implementation, the customized log-in module 110 is configured to monitor changes made to the username/user ID field for input of a log-in ID. Thus, when a user begins to input a log-in id, the customized log-in module 110 may operate to monitor and parse the input to discover a corresponding domain identifier that is incorporated in the log-in ID. In the case of an email address, for example, the customized log-in module 110 may be configured to extract a substring after the "at character" (e.g., @) in the email and before the "dot" in the email. This substring of the address typically correlates to a company/customer name or particular domain and may be taken as a domain identifier for the techniques described herein. Thus, in the case of an email "tobias@companyx.com", the substring "companyx" may be detected and extracted as the domain identifier.

Naturally, the customized log-in module 110 may be additionally configured to parse log-in IDs that are saved and entered automatically as well as log-in IDs in different formats in a comparable manner to extract corresponding domain identifiers. In addition or alternatively, the customized log-in module 110 may be configured to utilize other fields that may be indicative of a particular domain including but not limited a dedicated domain field for explicit input of the domain that is provided in addition to the credential fields and/or an address field that contains a URL for the page. These and other fields may be employed as sources of input that are indicative of suitable domain identifiers for particular domains/customers.

Having obtained a domain identifier corresponding to a user log-in attempt, the customized log-in module 110 may be configured to use the domain identifier at "C" to look-up and obtain corresponding customizations 124 that are mapped to the domain identifier. For example, the domain identifier may be employed to query customizations 124 that are available via a customization database 120 as previously described. The customization database 120 may be accessible via the service provider 112 as represented in FIG. 2. In an implementation, the customization database 120 may be associated with a corresponding web application 118 or other resources 116 to which the user is seeking access to upon authentication via the default page 202. In addition or alternatively, at least some customizations may be obtained from a local cache, a third party service, or other designated source/storage location based on the domain identifier.

In response to the request/query represented at "C," the service provider 112 (or other designated source) may provide corresponding customizations 124 at "D" as a response to the customized log-in module 110. For example, a style document or other data indicative of customizations 124 mapped to the extracted domain identifier (e.g., "companyx" in this example) may be supplied as a response to the query to enable implementation of the customizations to modify the default-page accordingly. Accordingly, at "E" customizations 124 indicated by the style document or other data obtained in response to the request may be applied via the customized log-in module 110 to modify the default page and output a customized page 204 that reflects the customizations 124. For example, the customized log-in module 110 may operate to cause application of a style document to a default page rendered by a browser and re-rendering of the page by the browser to present the customized page 204. For instance, a default CSS (or other style document) for a page may be replaced by a retrieved CSS that defines various customizations and the page may be re-rendered to show the customizations. To reiterate, this customization of the default page 202 to output a customized page 204 may occur prior to completion of the user log-in attempt. A user may then interact via the customized page 204 to complete the log-in attempt, such as by supplying remaining credentials (e.g., a password) and making a selection to submit the credentials to initiate authentication. Upon successful authentication, access to use the web application 118 and/or other resources 116 available from the service provider may be granted.

FIG. 3 illustrates generally at 300 the example interfaces/pages of FIG. 2 in greater detail as mentioned above. Here, a transition from the default page 202 to the customized page 204 is represented to illustrate some non-limiting examples of customizations 124 that may be applied on a domain-specific basis. In this example, the default page is represented as a relatively plain page that does not include logos, branding, or other customizations. The customized page 204 on the other hand includes a variety of different customizations 124 that may be applied responsive to detecting a domain identifier and querying based on the domain identifier as described herein.

By way of example, domain-specific customizations incorporated in the customized page 204 include a customized logo 302, image 304 (e.g., background image, picture, or other page image), font 305 selection, and layout 308 of page elements one to another. In addition, at least some functionality 310 of the page may be customized to provide domain-specific functionality. In this example, domain specific links to company info, news, industry links, and contacts, are represented. The customizations 124 also include styles 312, such as using rounded corners for input boxes, placing a password prompt in the corresponding field, a color scheme, text sizes, and other style elements. Other 314 customizations are also contemplated such as custom sound settings, background audio selections, security settings, authentication protocols, and/or themes, to name a few additional examples.

Having discussed example details of the techniques for customized log-in experiences, consider now some example procedures to illustrate additional aspects of the described techniques.

Example Procedures

This section describes example procedures in accordance with one or more implementations. Aspects of the procedures may be implemented in hardware, firmware, or software, or a combination thereof. The procedures is shown as a set of blocks that specify operations performed by one or more devices and are not necessarily limited to the orders shown for performing the operations by the respective blocks. In at least some embodiments the procedures may be performed by a suitably configured device, such as the example computing device 102 of FIG. 1 that includes or makes use of a customized log-in module 110 and/or a client application module 108.

Figure 4:
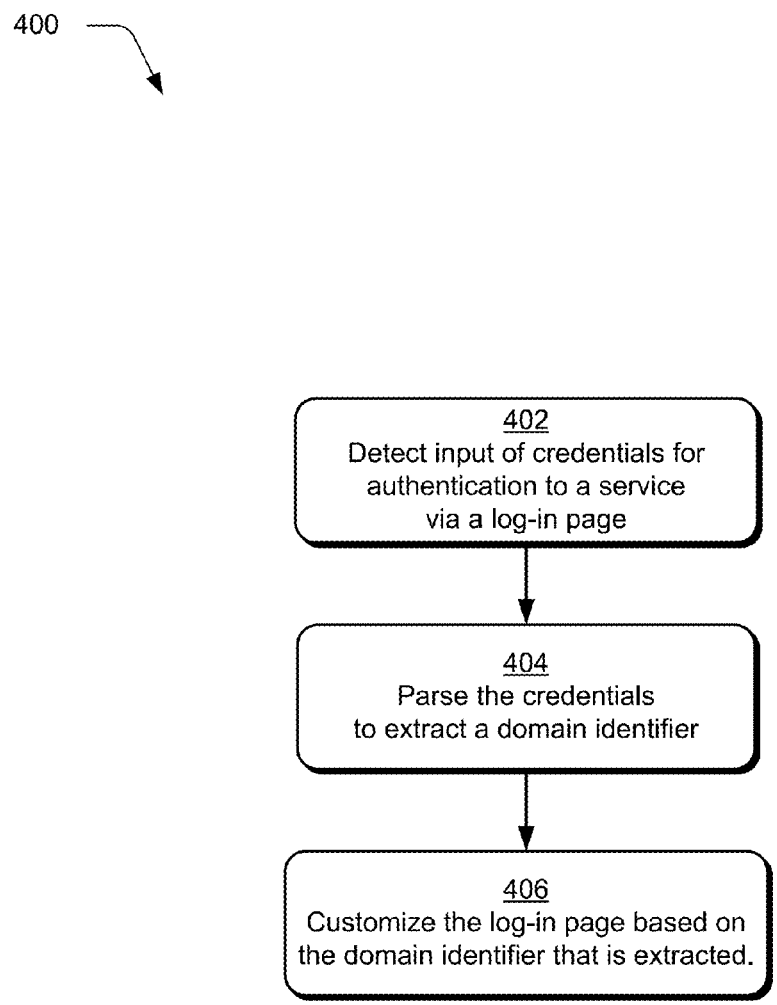
FIG. 4 is a flow diagram depicting an example procedure in accordance with one or more implementations.

FIG. 4 depicts an example procedure 400 in which a log-in page is customized based upon a domain identifier extracted from user credentials supplied during a log-in attempt. Input of credentials for authentication to a service is detected via a log-in page (block 402). For example, a customized log-in module 110 may operate to monitor input via a log-in page for a web application 118 or other resources as discussed herein. The monitoring may be configured to listen to user input of a username, log-in ID, direct input of a domain name, and/or other credentials supplied via corresponding fields. As noted, the customized log-in module 110 may alternatively be configured to monitor a URL or other pathname/address field that may be indicative of a particular domain/customer.

The credentials are parsed to extract a domain identifier (block 404). For instance, a supplied username or other credentials/field monitored by the customized log-in module 110 may be analyzed to extract a domain identifier incorporated in the credentials. In the case of an email address, the domain identifier may be extracted as a designated portion of the address. If a dedicated field for domain input is employed, the domain identifier may be correlated directly to input supplied via the dedicated field. As mentioned, the domain identifier corresponds to a particular customer for which customization of the log-in page may be defined. In one approach, the domain identifier may be obtained based on a single particular field such as the username field or the page address. Generally, the customizations may be triggered based on partial input of credentials and/or prior to submission of credentials for authentication. Moreover, the customizations may be applied independently of input of a password for authentication. For example, in a scenario in which a username field is employed as a trigger for the customizations, the page is customized responsive to input of a username and regardless of whether or not a corresponding password is input, e.g., independently of input of the corresponding password.

The log-in page is customized based on the domain identifier that is extracted (block 406). Here, the domain identifier extracted from suitable credentials and/or monitored fields may be employed to look-up and obtain corresponding customizations as described previously. For instance, the domain identifier may be employed to reference customizations 124 from a customization database 120 or other source of data indicative of the customizations 124. Further, details regarding techniques to ascertain and apply domain-specific customization are described in relation to the following figure.

Figure 5:
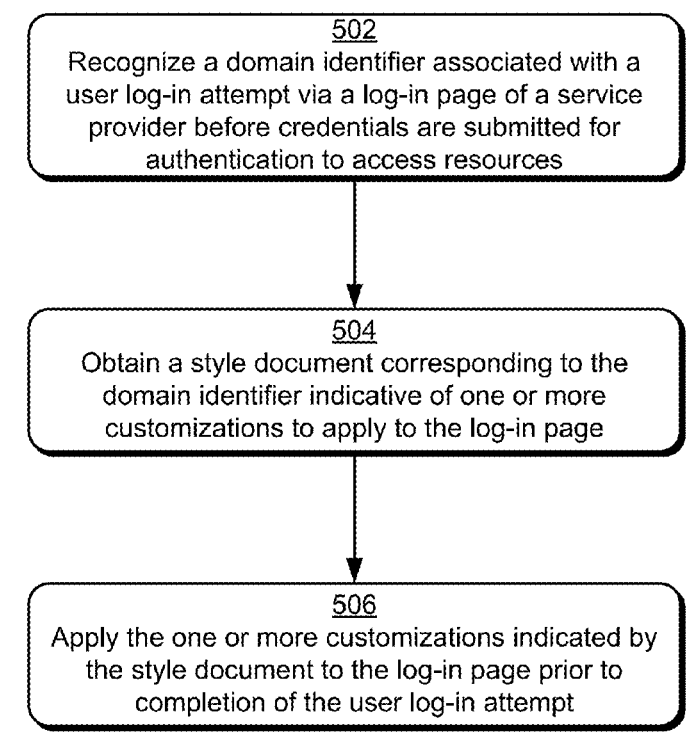
FIG. 5 is another flow diagram depicting an example procedure in accordance with one or more implementations.

FIG. 5 depicts an example procedure 500 in which customizations indicated by a style document are applied to customize a log-in page of a service. A domain identifier associated with a user log-in attempt via a log-in page of service provider is recognized before credentials are submitted for authentication to access resources (block 502). For example, input of credentials by a user or automatically based upon saved log-in data may be examined to recognize a domain identifier associated with the credentials, as described previously. The recognition may be based upon parsing of credential fields or other fields indicative of a particular domain. This may occur before complete information (e.g., username and password) for authentication of a user is input and/or submitted to initiate the authentication. In other words, the domain identifier may be extracted from suitable fields prior to completion of the user log-in attempt.

Once a domain identifier is recognized, a style document corresponding to the domain identifier is obtained that is indicative of one or more customizations to apply to the log-in page (block 504). In one approach, the domain identifier may be employed to construct a path name/address to a designated storage location for domain-specific customizations. The storage location may be accessible via a server of the service provider 112 or another remote storage location. At least some domain-specific customizations may optionally be cached locally in storage of a client and therefore may be accessed from local storage. Cached domain-specific customizations may include at least customizations that have been previously downloaded and applied at a particular computing device. The constructed path name may be derived by using the domain identifier to create a reference to a file location and/or particular file in a designated format. For instance, the path name may be a combination of a server/service URL, a folder location, and a filename that combines the domain identifier with a file extension (e.g., .css or .xslt). For example, if the domain identifier "companyx" is recognized and cascading style sheets are used to convey customizations, the path name may be generated as "serviceproviderpath/resource/styles/companyx.css". In this example a "styles" folder may include a plurality of style documents that correlate to domain identifiers and described corresponding customizations. In another approach, the domain identifier may be used as a resource identifier in a request to access a corresponding style document from a server or a local cache.

In any event, the domain identifier may be employed to look-up, access, download, or otherwise obtain a corresponding style document that is indicative of one or more customizations to apply to the log-in page. Then, the one or more customizations indicated by the style document are applied to the log-in page prior to completion of the user log-in attempt (block 506). For example, a downloaded style document may be applied to a default page to effectuate one or more customizations and re-render the page as a customized page as discussed and depicted in relation to FIGS. 2 and 3. The customizations may occur based on input of credentials in relation to a user log-in attempt, but prior to completion of the user log-in attempt. Thus, the default page is customized in a domain-specific manner even before a user is authenticated to access resources from a provider.

Having described example procedures in accordance with one or more implementations, consider now a discussion of example systems and devices that can be utilized to implement the various techniques described herein.

Example System and Device

Figure 6:
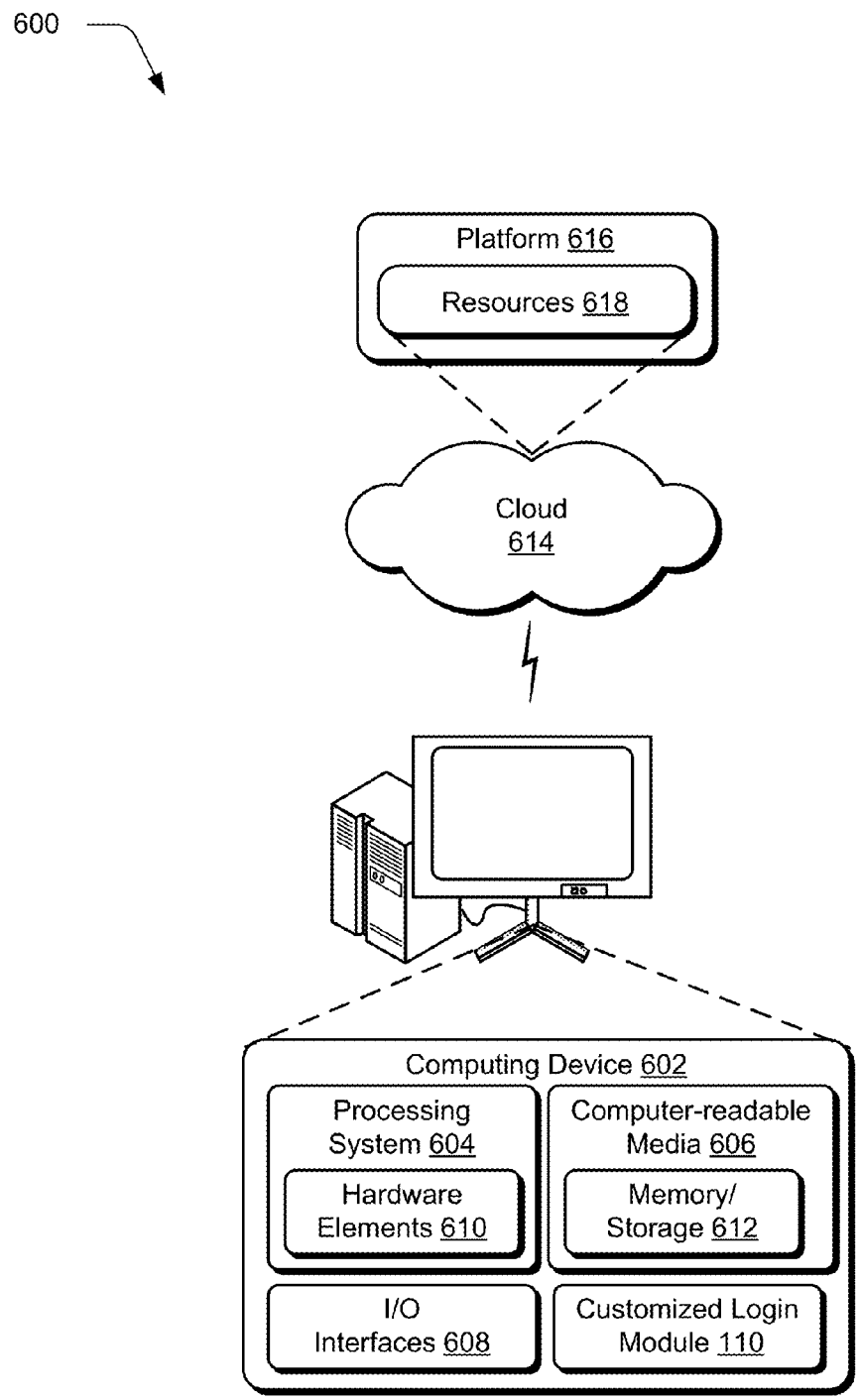
FIG. 6 illustrates an example system including various components of an example device that can be employed for one or more implementations of customized log-in experiences described herein.

FIG. 6 illustrates an example system generally at 600 that includes an example computing device 602 that is representative of one or more computing systems and/or devices that may implement the various techniques described herein. This is illustrated through inclusion of the customized log-in module 110, which operates as described above. The computing device 602 may be, for example, a server of a service provider, a device associated with a client (e.g., a client device), an on-chip system, and/or any other suitable computing device or computing system.

The example computing device 602 is illustrated as including a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although techniques have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter.

What is claimed is:
1. A method implemented by a computing device, the method comprising:
  detecting input of partial credentials for authentication to a service via a log-in page;

extracting a domain identifier from the detected partial credentials;

customizing the log-in page based on the extracted domain identifier to implement one or more domain-specific customizations of the log-in page;

rendering the customized log-in page for display via a display device of the computing device; and using the customized log-in page to facilitate submission of the partial credentials and an additional credential for authorization to the service.

2. The method of claim 1, wherein the partial credentials comprises a username in the form of an email address that contains the domain identifier as a substring.

3. The method of claim 2, further comprising parsing the email address to extract the substring.

4. The method of claim 2, wherein the customizing occurs responsive to input of the username and independent of input of a corresponding password to gain access to the service.

5. The method of claim 1, further comprising querying a customization database using the domain identifier to access the one or more customizations mapped to the domain identifier.

6. The method of claim 5, wherein querying the customization database comprises constructing a path name to a location of the customization database using the extracted domain identifier.

7. The method of claim 6, wherein the customization database is accessible via a server associated with a service provider that provides the service.

8. The method of claim 6, wherein the customization database is accessible as a cache at the computing device that stores customizations corresponding to one or more previously accessed domains in association with corresponding domain identifiers.

9. The method of claim 1, wherein customizing the log-in page based on the extracted domain identifier comprises:

obtaining a style document that defines the one or more customizations and is mapped to the extracted domain identifier; and applying the one or more customizations to the log-in page as defined by the style document.

10. The method of claim 1, wherein the one or more customizations of the log-in page include at least one of a logo, an image, a font selection, a layout of page elements, functionality, or a style for page elements defined to customize the log-in page on a domain-specific basis.

11. The method as described in claim 1, wherein the service comprises a web application accessible over a network from a service provider for execution via a browser at the computing device.

12. The method as described in claim 1, wherein the one or more customizations are retrieved via a server-side repository that enables customization of the log-in page without storing state data indicative of the one or more customizations at the computing device.

13. One or more computer-readable storage media comprising instructions stored thereon that, responsive to execution by a computing device, cause the computing device to implement a customized log-in module to perform operations including:

recognizing a domain identifier from an input of partial credentials associated with a log-in attempt via a log-in page of a service provider before credentials are submitted for authentication to access resources available from the service provider;

obtaining a style document corresponding to the domain identifier indicative of one or more customizations to apply to the log-in page;

applying the one or more customizations indicated by the style document to the log-in page;

rendering the customized log-in page for display via a display device of the computing device prior to completion of the log-in attempt; and using the customized log-in page to facilitate submission of the partial credentials and an additional credential through interaction with the customized log-in page for authorization to the service provider.

14. The one or more computer-readable storage media as described in claim 13, wherein the domain identifier is recognized by parsing input for a username field exposed by the log-in page before credentials associated with the username field are submitted for authentication.

15. The one or more computer-readable storage media as described in claim 13, wherein:

the style document comprises a cascading style sheet (CSS) configured to define the one or more customizations; and applying the one or more customizations comprises:

replacing a default cascading style sheet for the log-in page with the cascading style sheet (CSS) configured to define the one or more customizations that is obtained; and re-rendering the log-in page.

16. The one or more computer-readable storage media as described in claim 13, wherein applying the one or more customizations comprises at least changing a background image for the log-in page to a customized image mapped to the domain identifier.

17. A computing device comprising:

a processing system;

one or more memories storing instructions executable via the processing system to perform operations to implement a customized log-in experience in connection with a web application available from a service provider, the operations comprising:

extracting a domain identifier associated with a detected input of partial credentials of a log-in attempt via a log-in page of the service provider before authentication of the log-in attempt;

constructing a path name to retrieve a style document from a designated storage location based on the domain identifier, the style document configured to indicate one or more customizations for the log-in page for a domain associated with the domain identifier;

obtaining the style document from the designated storage location using the path name;

applying the one or more customizations indicated by the style document to the log-in page prior to completion of the log-in attempt;

rendering the customized log-in page for display via a display device of the computing device;

detecting a request to submit the partial credentials through interaction via the customized log-in page; and submitting the partial credentials and an additional credential for authentication to the service provider via the customized log-in page.

18. The computing device as described in claim 17, wherein the domain identifier comprises a name of a particular customer of the service provider.

19. The computing device as described in claim 17, wherein the domain identifier is extracted from an address for the log-in page that contains the domain identifier.

20. The computing device as described in claim 17, wherein the designated storage location comprises a customization database available at a server associated with the service provider and configured to map domain identifiers corresponding to a plurality of customers of the service provider to style documents that define corresponding customizations, the customization database at the server enabling customizations to be applied in a pre-login environment without maintaining state data regarding the customizations individually at client computing devices.

* * * * *